US 11,455,286 B2

United States Patent
Ejsing et al.

(10) Patent No.: US 11,455,286 B2
(45) Date of Patent: Sep. 27, 2022

(54) HISTORY OF SLOWLY CHANGING DIMENSIONS

(71) Applicant: FinancialForce.Com, Inc., San Francisco, CA (US)

(72) Inventors: Simon Ejsing, Redmond, WA (US); Andrew Chico, Bellvue, WA (US)

(73) Assignee: FinancialForce.com, Inc., San Francisco, CA (US)

( * ) Notice: Subject to any disclaimer, the term of this patent is extended or adjusted under 35 U.S.C. 154(b) by 272 days.

(21) Appl. No.: 16/532,669

(22) Filed: Aug. 6, 2019

(65) Prior Publication Data
US 2021/0042279 A1 Feb. 11, 2021

(51) Int. Cl.
*G06F 16/00* (2019.01)
*G06F 16/21* (2019.01)
*G06F 16/2458* (2019.01)

(52) U.S. Cl.
CPC .......... *G06F 16/219* (2019.01); *G06F 16/213* (2019.01); *G06F 16/2477* (2019.01)

(58) Field of Classification Search
CPC ... G06F 16/219; G06F 16/2474; G06F 16/213
See application file for complete search history.

(56) References Cited

U.S. PATENT DOCUMENTS

| | | | |
|---|---|---|---|
| 8,156,083 B2* | 4/2012 | Banerjee | G06F 16/217 707/684 |
| 2006/0190487 A1* | 8/2006 | Hicks | G06Q 10/087 |
| 2009/0006146 A1* | 1/2009 | Chowdhary | G06F 16/26 705/7.11 |
| 2014/0279977 A1* | 9/2014 | Milousheff | G06F 16/219 707/695 |
| 2016/0069703 A1* | 3/2016 | Nakano | G09B 29/007 701/428 |
| 2019/0079959 A1* | 3/2019 | Ramaiyer | G06F 16/283 |
| 2019/0179729 A1* | 6/2019 | Roskowski | G06F 11/3452 |

OTHER PUBLICATIONS

Nguyen, Tho Manh, et al. "An approach towards an event-fed solution for slowly changing dimensions in data warehouses with a detailed case study." Data & Knowledge Engineering 63.1 (2007): 26-43.*

Malinowski, Elzbieta, and Esteban Zimanyi. "A conceptual solution for representing time in data warehouse dimensions." Proceedings of the 3rd Asia-Pacific conference on Conceptual modelling-vol. 53. 2006.*

* cited by examiner

Primary Examiner — Nan Hutton
(74) Attorney, Agent, or Firm — Kokka & Backus, PC

(57) ABSTRACT

Disclosed herein is a data structure that reduces computational load on a database in querying and visualizing historical values of slowly changing dimensions. The slowly changing dimensions have one or more values associated with them (e.g., a monthly average accounts receivable is a single value, and a set of contact information for an individual may have multiple values). On a periodic basis, database images, also known as "snapshots" are generated of a current status of a given database. The snapshots are used to build a historical data table that is computationally efficient to reference.

14 Claims, 7 Drawing Sheets

FIG. 5

HISTORY OF SLOWLY CHANGING DIMENSIONS

TECHNICAL FIELD

The disclosure relates to user building or rebuilding slowly changing dimension tables, and more particularly to constructing the slowly changing dimension tables via snapshots of a data source.

BACKGROUND

Slowly changing dimensions are data elements that change infrequently on a computational scale. Changes occur on a time scale that is perceivable by humans. For example, a value that changes in a database no more than several times a day is infrequent on a computational scale. Another example of computationally infrequent is consuming less than 1% of a processing core's cycles.

Users of a data source containing slowly changing dimensions often require visibility into the status of the value of those dimensions over time. Present methods are computationally inefficient.

BRIEF DESCRIPTION OF THE DRAWINGS

FIG. 5 is a screenshot of a set of snapshots that inform the slowly changing dimension table.

DETAILED DESCRIPTION

Disclosed herein is a data structure that reduces computational load on a database in querying and visualizing historical values of slowly changing dimensions. A data source or a database includes a number of stored entities or objects. The objects have one or more values associated with them (e.g., a monthly average accounts receivable is a single value, and a set of contact information for an individual may have multiple values).

On a periodic basis, database images, also known as "snapshots" are generated of a current status of a given database. The snapshots enable reverting or recreating the last recorded state of the database. In some circumstances, users may want to review how the database has changed over time. In prior art systems, users had to query a set of snapshots and individually review those snapshots. Calling a number of snapshots requires a computational process that may be measured in whole seconds. On a contemporary computational device, calling approximately thirty database snapshots may take eight to ten seconds (the scaling "n" computational complexity of the query is the number of snapshots called). The query requires significantly more time for a human to read and comprehend the data presented.

Through generation of an additional data structure that stores historical changes in a slowly changing dimension, the computational processing time may be measured in milliseconds. For a similar query as described above, processing the call for the slowly changing dimension may take 300 milliseconds on a modern processing device. The "n" for which the computational query is based is the number of slowly changing dimensions called as opposed to a number of snapshots. The "n" of the data structure is a more slowly growing variable that the "n" of calling snapshots, and each called object is a smaller amount of data (a single element within a data structure as opposed to multiple copies of whole databases).

The data structure stores a history of values (e.g., slowly changing dimension was x during a first time range, y during a second time range, and z during a third time range) by processing a set of snapshots with respect to each slowly changing dimension. Processing of the snapshots is chronologically agnostic with respect to order. The history includes a timestamp range of each value held by the slowly changing dimension.

Figure 1:
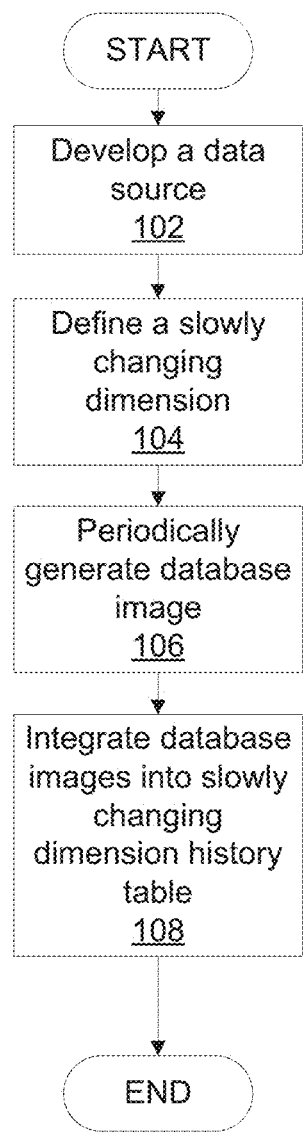
FIG. 1 is a flowchart illustrating a method of generating a data structure including a history of slowly changing dimensions.

FIG. 1 is a flowchart illustrating a method of generating a data structure including a history of slowly changing dimensions. In step 102, a system develops a data source or a database. The database includes a number of objects or entities that store values. Entities such as contact information, sales data, accounts receivable, personal statistics, values assigned to opportunities, etc. are all suitable examples.

In step 104, one or more of the entities is defined as a relevant slowly changing dimension. The slowly changing dimensions are data values that do not change frequently on a computational scale. For the purposes of this disclosure, a slowly changing dimension is a value that, on average, changes less frequently than the rate the system generates database snapshots of the database containing the value. While each of the entities provided as an example above is inherently a slowly changing dimension as a function of the frequency of updates, a "relevant" slowly changing dimension is determined either by the system automatically or by a user of the system. A relevant slowly changing dimension is one that is included in a history table of slowly changing dimensions.

The system may automatically define the relevancy of a slowly changing dimension by data types—that is, all objects/entities falling into certain classes may be automatically defined as relevant slowly changing dimensions. Users may define any object/entity with a store value as a relevant slowly changing dimension based on whim or other arbitrary criteria. A given slowly changing dimension may include multiple elements each storing a different value. For example, where the slowly changing dimension is contact information, one element may be a phone number, and another element may be an email address.

In step 106, the system periodically captures database images of the database storing the objects. These database snapshots may be generated prior to the definition of relevant slowly changing dimensions. Dimensions may be defined after the existence of database snapshots. Examples of the frequency include twice daily, daily, bi-weekly, and monthly. Database snapshots are typically used to revert the database to a previous snapshot, or to parse through changes. However, parsing through changes is typically performed using the database images themselves. Using the database images to parse through history is a cumbersome, human intensive process.

In step 108, the database snapshots are processed into a data structure that stores historical ranges for which a given slowly changing dimension held a particular value. The ranges are continuous through time and non-overlapping. Each element of each slowly changing dimension has a table that stores the timestamp range where the element held a particular value. A value that changes multiple times between periodic snapshots will not be captured by the table.

Figure 2:
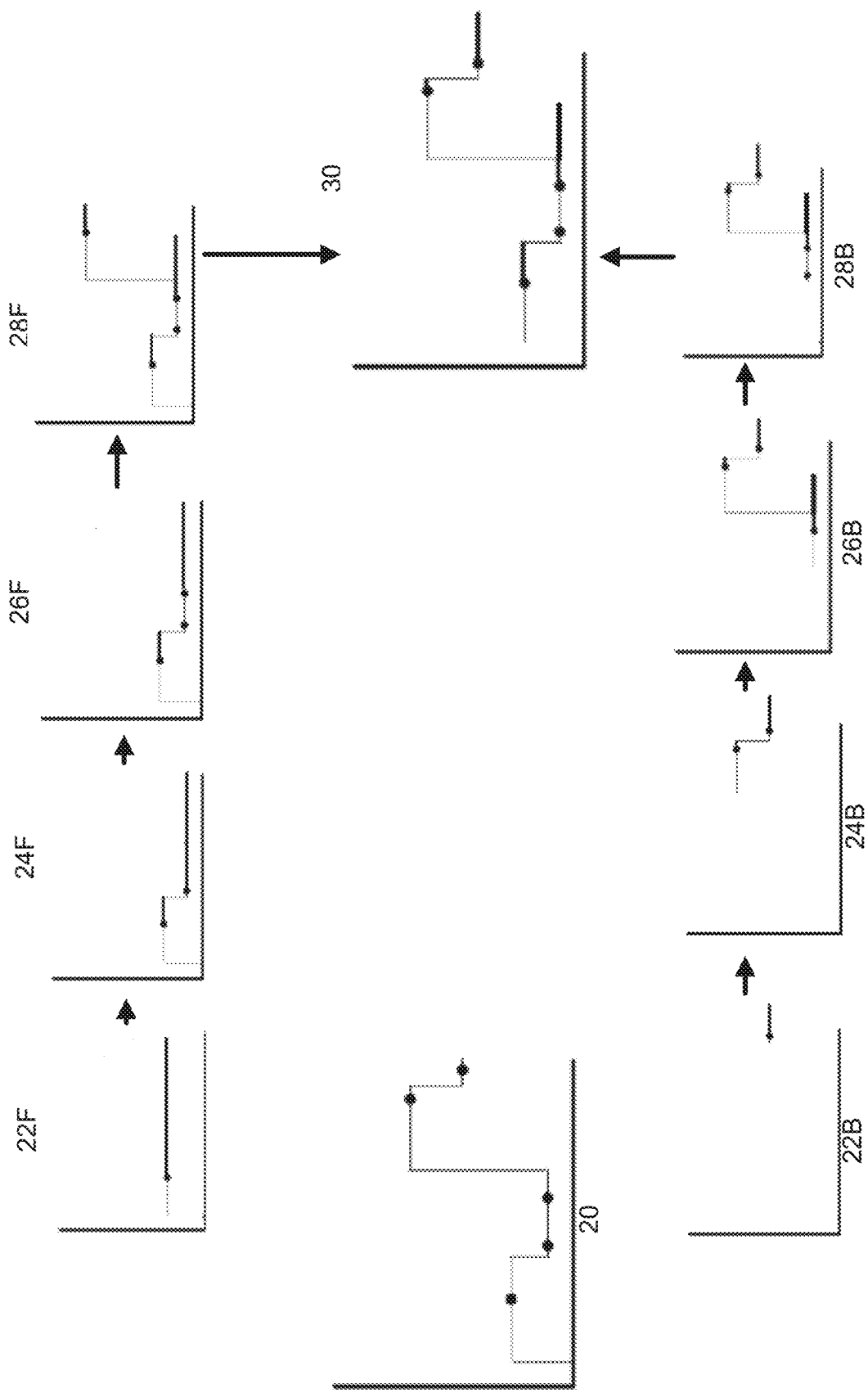
FIG. 2 is an illustration of a set of graphs depicting chronologically agnostic assembly of a data structure.

FIG. 2 is an illustration of a set of graphs depicting chronologically agnostic assembly of a data structure. Each of the graphs depicted represent the plot of some numerically sorted value (Y axis) as a function of time (X axis). The graph to the left side represents reality 20. The thin plotted line represents actual values held by a plotted slowly changing dimension. The bullet points represent the values of the slowly changing dimension as recorded in database snapshots.

The remaining set of graphs illustrate a progression of integration of database snapshots building (in graphs 22, 24, 26, and 28) from a first snapshot toward the last graph 30 including all available snapshots. The bolded horizontal lines following the snapshots represent the values held in the historical data table for slowly changing dimensions.

Notably, there are instances where the value in the historical data table for a given point in time differs from reality 20. The difference is a result of the granularity of periodically captured snapshots. If no snapshot was taken at a contemporaneous period with a change in value, the historical data table will not have the real value represented during that change.

The set of graphs proceeding along the top of the figure, "F," integrate snapshots progressing forward chronologically. The set of graphs proceeding along the bottom of the figure, "B," integrate snapshots in reverse order chronologically. Ultimately, integration of snapshots is order agnostic. Generation of the historical data table is order agnostic in order to improve taking advantage of parallel computing. In graph 22F the system integrates the first snapshot (chronologically). The bolded line continues off to the present because there are no integrated records that suggest otherwise. In 24F, the system integrates the second snapshot and the graph adjusts. The non-bolded line closely follows the historical data table (represented by the bold line) because the second snapshot was taken shortly after the change.

In 26F, the third snapshot does not change in value. In 28F, the fourth snapshot changes value. Notably, the non-bolded line diverges from the bolded lines. This is because the change to the database was made long before the next periodic snapshot was taken. However, because the values change slowly, the error is minimal, and no important data is unrepresented.

In some embodiments, rather than dating the change back to a most recent snapshot, the date of a sysmmodstamp is used. A systemmodstamp is a timestamp for when a change to the database was made. In some databases the data includes a metadata value for when the change was made. Thus, the snapshots further include the time of the change and are thus more accurate than is pictured in FIG. 2.

In 30, the system has integrated all of the snapshots and the historical data table substantially reflects the real data. Across the bottom of the figure, the set of graphs depict the same integration of data in reverse.

Figure 3:
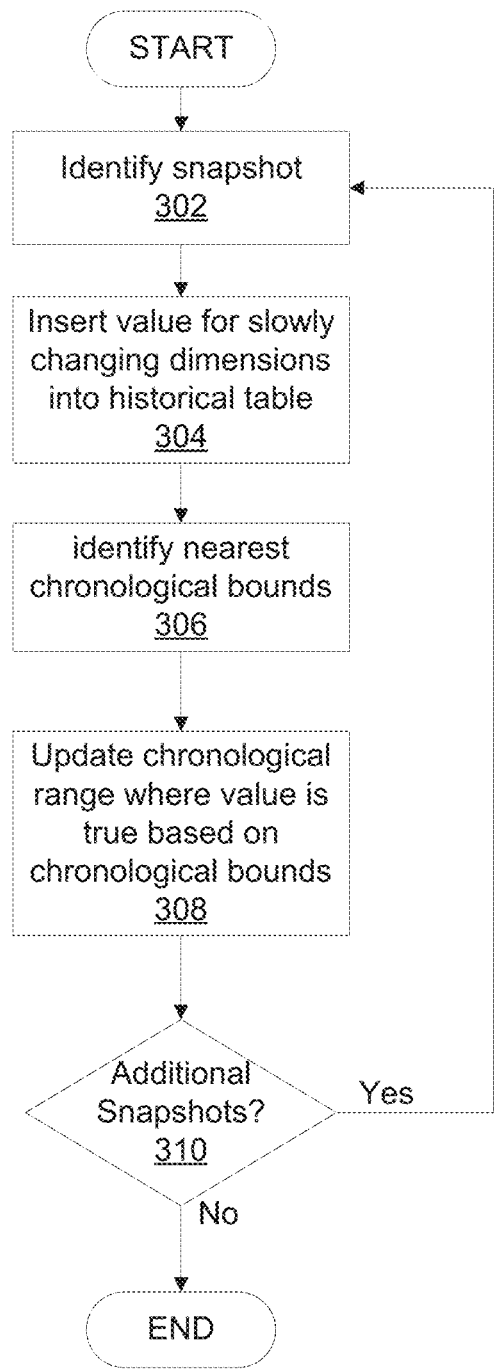
FIG. 3 is a flowchart illustrating a method of integrating snapshots into a slowly changing dimension table.

FIG. 3 is a flowchart illustrating a method of integrating snapshots into a slowly changing dimension table. In step 302, the system identifies a snapshot to integrate. When step 302 begins, there may be only a single snapshot to integrate because the system has been operating for some time and the historical data table is largely complete (aside from the most recent snapshot). Alternatively, there may be a lot of snapshots to work from. The system may newly introduce a relevant slowly changing dimension such that each of the snapshots is processed with respect to the new slowly changing dimension for the first time.

In step 304, the system inserts the value for the relevant slowly changing dimension as recorded in the snapshot to the timestamp of the snapshot (or alternatively the timestamp of the system modification). The value for the time previously held at the timestamp ends just prior to the timestamp, and the new value proceeds from the timestamp of the snapshot. In step 306, the system identifies the closest timestamps chronologically forward having an integrated snapshot. In some cases, there is no snapshot going forward through to the present, and then the newly integrated snapshot is the most recent.

In step 308, the system updates the chronological range of the value of the current snapshot from the respective timestamp of the snapshot up until the timestamp of the next snapshot proceeding chronologically forward. If there is no next timestamp, then the range proceeds until the present. In step 310, the system determines whether there exist additional snapshots to integrate. Where there are additional snapshots the method repeats from step 302.

The method of FIG. 3 may be operated in parallel. No step interferes with other steps. Two snapshots closer to each other than any other may be processed at near simultaneous times and the result when both complete will be the same. In some embodiments, the method depicted in FIG. 3 is performed prior to queries concerning slowly changing dimensions.

Figure 4:
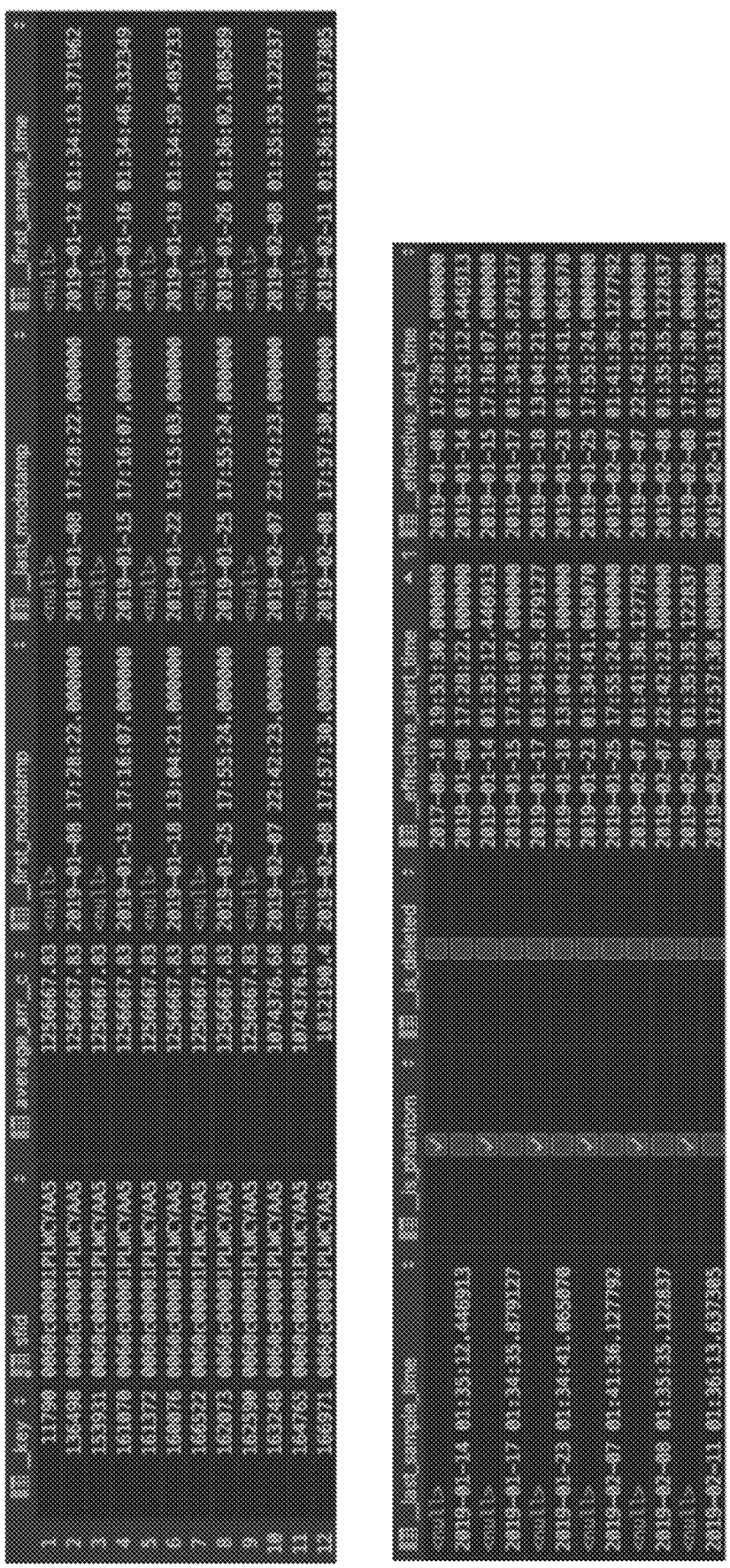
FIG. 4 is a screenshot of a screenshot of an example system output in response to a slowly changing dimension query.

FIG. 4 is a screenshot of a screenshot of an example system output in response to a slowly changing dimension query. Two sets of horizontal rows are pictured. The second aligns with the first. The output is directed to a slowly changing dimension for the average annual recurring revenue (AARR) amount for a single opportunity. As a point of nomenclature, each column prefixed with "_" is used for the system to keep track of state. The columns entitled, "sfid," and "average_arr_c" refer to part of the slowly changing dimension queried. Specifically, "sfid" refers to an identifier for a given row/record of a snapshot. The average_arr_c column changes value over time and is the relevant slowly changing dimension.

The figure additionally includes two sets of first/last columns. Internally the system merges/compresses snapshots when the dimensional value has not changed between consecutive snapshots; however, in order to do merge correctly while staying invariant to the order, the system keeps track of the earliest and latest snapshot values of the "systemmodstamp" and "sample_time." The systemmodstamp is the last time the entity was updated in the source system. The sample_time is the timestamp for the snapshot.

The column marked as "_key" is an internal unique id for the particular slowly changing dimension of the particular snapshot. The columns entitled "_first_modstamp" and "_last mod_stamp" are the values from the earliest and latest (respectively) snapshot that the given row in the table represents for when the source record was last modified. Notably, over time many rows are merged. As depicted in the figure, the first nine rows hold the same value and will eventually be merged during processing. The columns "_first_sample_time" and "_last_sample_time" are the timestamp for the earliest and latest (respectively) snapshot that the given row represents.

The column, "_is_phantom" represents if the row is a phantom (e.g., a best estimate, or a guaranteed representation of the source system value). The column "_is_deleted" reflects whether the row or record was deleted in the source system at the time (e.g., did not hold a value). The column, "_effective_start_time," and "_effective_end_time" designates the period in time where the relevant slowing changing dimensional value was in effect.

Figure 5:
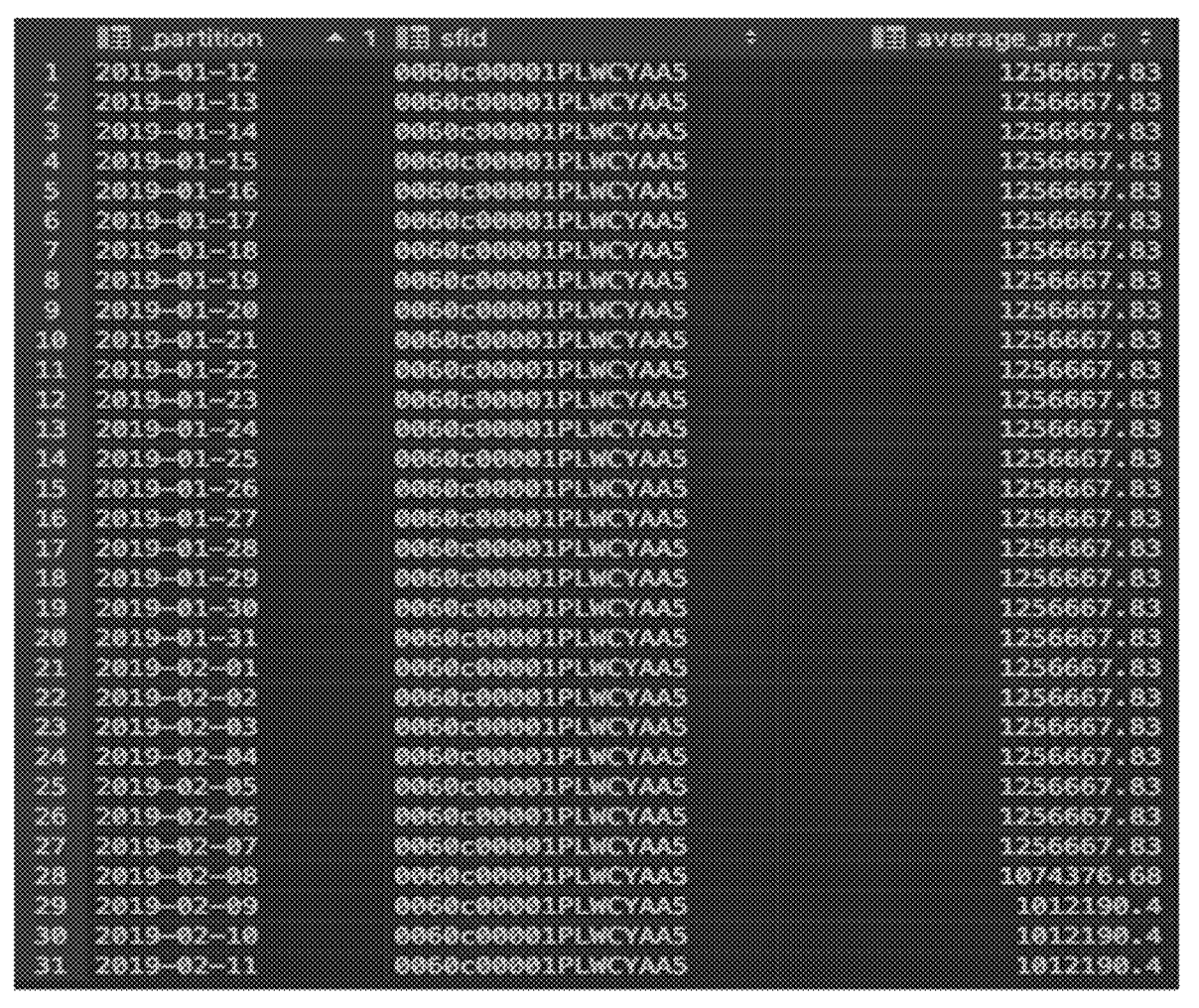

FIG. 5 is a screenshot of a set of snapshots that inform the slowly changing dimension table. Each of the rows in FIG. 5 is a snapshot that is included in the historical dimension table depicted in FIG. 4. Prior to existence of the historical dimension table of FIG. 4, a user would have to query all snapshots available and parse through each individually to obtain the same information.

Figure 6:
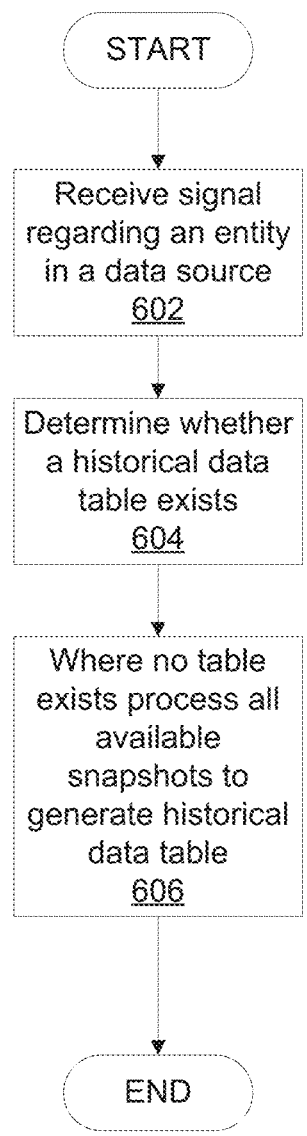
FIG. 6 is a flowchart illustrating the generation of slowly changing dimensions.

FIG. 6 is a flowchart illustrating the generation of slowly changing dimensions. In step 602, the system receives a signal regarding an entity within a database to classify as a relevant slowly changing dimension. The signal may originate from an automated system definition or based on user input. I step 604, the system determines whether a table currently exists for the identified entity. When no such table exists, in step 606, the system processes each of the available snapshots up to the present.

Figure 7:
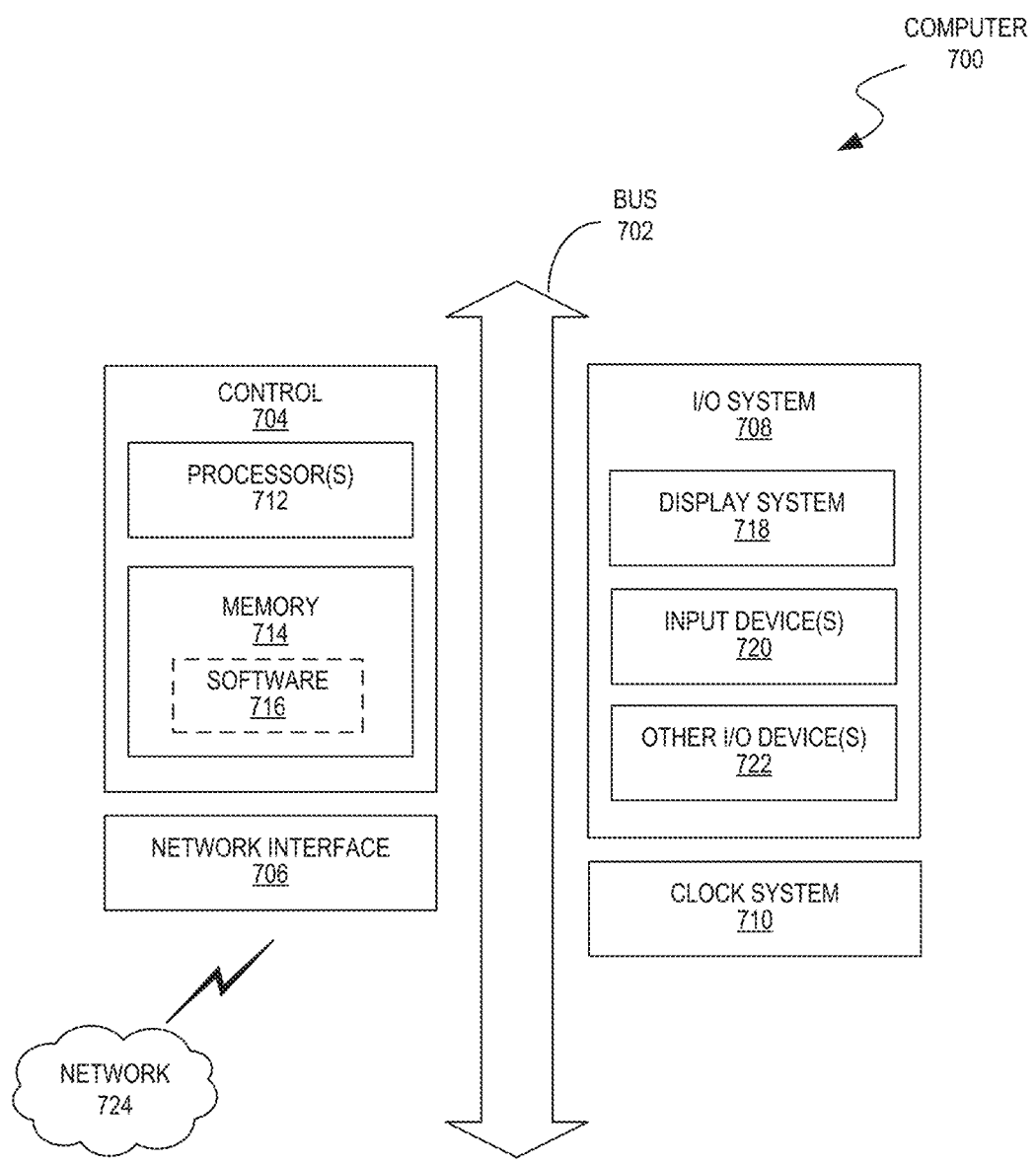
FIG. 7 is a block diagram of a computer operable to implement the disclosed technology according to some embodiments of the present disclosure.

FIG. 7 is a block diagram of a computer 700 operable to implement the disclosed technology according to some embodiments of the present disclosure. The computer 700 may be a generic computer or specifically designed to carry out features of the disclosed user input conversion system. For example, the computer 700 may be a system-on-chip (SOC), a single-board computer (SBC) system, a desktop or laptop computer, a kiosk, a mainframe, a mesh of computer systems, a handheld mobile device, or combinations thereof.

The computer 700 may be a standalone device or part of a distributed system that spans multiple networks, locations, machines, or combinations thereof. In some embodiments, the computer 700 operates as a server computer or a client device in a client-server network environment, or as a peer machine in a peer-to-peer system. In some embodiments, the computer 700 may perform one or more steps of the disclosed embodiments in real time, near real time, offline, by batch processing, or combinations thereof.

As shown in FIG. 7, the computer 700 includes a bus 702 that is operable to transfer data between hardware components. These components include a control 704 (e.g., processing system), a network interface 706, an input/output (I/O) system 708, and a clock system 710. The computer 700 may include other components that are not shown nor further discussed for the sake of brevity. One who has ordinary skill in the art will understand elements of hardware and software that are included but not shown in FIG. 7.

The control 704 includes one or more processors 712 (e.g., central processing units (CPUs)), application-specific integrated circuits (ASICs), and/or field-programmable gate arrays (FPGAs), and memory 714 (which may include software 716). For example, the memory 714 may include volatile memory, such as random-access memory (RAM), and/or non-volatile memory, such as read-only memory (ROM). The memory 714 can be local, remote, or distributed.

A software program (e.g., software 716), when referred to as "implemented in a computer-readable storage medium," includes computer-readable instructions stored in the memory (e.g., memory 714). A processor (e.g., processor 712) is "configured to execute a software program" when at least one value associated with the software program is stored in a register that is readable by the processor. In some embodiments, routines executed to implement the disclosed embodiments may be implemented as part of an operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 700), which, when read and executed by at least one processor (e.g., processor 712), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 714).

The network interface 706 may include a modem or other interfaces (not shown) for coupling the computer 700 to other computers over the network 724. The I/O system 708 may operate to control various I/O devices, including peripheral devices, such as a display system 718 (e.g., a monitor or touch-sensitive display) and one or more input devices 720 (e.g., a keyboard and/or pointing device). Other I/O devices 722 may include, for example, a disk drive, printer, scanner, or the like. Lastly, the clock system 710 controls a timer for use by the disclosed embodiments.

Operation of a memory device (e.g., memory 714), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method of improving database visualization, comprising:
periodically generating a set of database images of a database;
including a timestamp on each of the set of database images;
defining a slowly changing dimension in the database, the slowly changing dimension comprising a value that on average changes less frequently than a rate of said periodically generating the set of database images of the database;
integrating the set of database images into a data structure, the data structure storing a history of the slowly changing dimension including a range of time associated with each value held by the slowly changing dimension, wherein said integrating is chronologically agnostic with respect to a timestamp order of integration of each of the set of database images, and the each value is associated with a database image of the set of database images and the data structure is configured to integrate, in parallel, a progressing forward chronological database image with a progressing reverse chronological database image, another range of time being stored in the data structure when another value held by the slowly changing dimension different than the each value held by the slowly changing dimension is determined, the another value being associated with a database image different than another database image associated with the each value, the range of time being temporally continuous and non-overlapping with the another range of time; and
preparing a report based on the data structure that visually depicts in a display system the history of the slowly changing dimension.

2. The method of claim 1, wherein the slowly changing dimension includes multiple fields each including an independent value.

3. The method of claim 1, wherein the slowly changing dimension is a first slowly changing dimension of a plurality of slowly changing dimensions and the database stores a history of the plurality of slowly changing dimensions.

4. The method of claim 1, further comprising:
generating an additional database image of the database at a present timestamp; and
updating the data structure based on the additional database image.

5. The method of claim 1, further comprising:
isolating erroneous values in the history based on a specified criterion; and
correcting the history where erroneous values are present.

6. The method of claim 1, wherein the value is non-numeric.

7. The method of claim 1, wherein the value is numeric, and the method further comprising:
displaying the history in a graph interface as a function of the value to time.

8. The method of claim 1, wherein the history is of the slowly changing dimension is continuous and non-overlapping in time.

9. The method of claim 1, wherein said integrating further comprises:
arbitrarily ordering the set of database images; and
integrating database images into the data structure based on the arbitrary order in parallel.

10. The method of claim 1, wherein said defining is performed subsequent to generation of the set of database images.

11. A system comprising:
a database storing values that change over time in response to computationally infrequent revisions;
a processor; and
a memory including instructions that cause the processor to:
periodically generate a database image of the database, wherein a first database image includes the first value of the object at a first timestamp;
define a slowly changing dimension based on a first object stored in the database, the slowly changing dimension comprising a variable value that on average changes less frequently than a rate of said periodically generating the set of database images of the database;
integrate the first database image into a data structure stored in the memory, the data structure storing a history of the slowly changing dimension including a range of time each value held by the slowly changing dimension, wherein said integrating is chronologically agnostic with respect to a timestamp order of integration of each of the set of database images, and the each value is associated with a database image of the set of database images and the data structure is configured to integrate, in parallel, a progressing forward chronological database image with a progressing reverse chronological database image, and wherein the history includes a range of time of each value held by the slowly changing dimension, another range of time being stored in the data structure when another value held by the slowly changing dimension different than the each value held by the slowly changing dimension is determined, the another value being associated with a database image different than another database image associated with the each value, the range of time being temporally continuous and non-overlapping with the another range of time; and
preparing a report based on the data structure that visually depicts in a display system the history of the slowly changing dimension.

12. The system of claim 11, wherein the first object represented as the slowly changing dimension includes multiple fields, each of the fields including an independent value.

13. The system of claim 11, wherein the slowly changing dimension is a first slowly changing dimension of a plurality of slowly changing dimensions and the database stores a history of the plurality of slowly changing dimensions.

14. The system of claim 11, wherein the history is of the slowly changing dimension is continuous and non-overlapping in time.

* * * * *